(12) United States Patent
Shields

(10) Patent No.: US 9,055,762 B2
(45) Date of Patent: Jun. 16, 2015

(54) UV ADAPTER FOR PREPARATION OF NEONATE NUTRITIONAL FLUID

(71) Applicant: Angele Innovations, LLC, San Marcos, CA (US)

(72) Inventor: Janice M. Shields, San Marcos, CA (US)

(73) Assignee: ANGELE INNOVATIONS, LLC, San Marcos, CA (US)

( * ) Notice: Subject to any disclaimer, the term of this patent is extended or adjusted under 35 U.S.C. 154(b) by 98 days.

(21) Appl. No.: 13/967,127

(22) Filed: Aug. 14, 2013

(65) Prior Publication Data

US 2015/0050398 A1 Feb. 19, 2015

(51) Int. Cl.

| | |
|---|---|
| *A23L 3/28* | (2006.01) |
| *A23L 1/29* | (2006.01) |
| *A23L 1/025* | (2006.01) |
| *A47J 36/24* | (2006.01) |

(52) U.S. Cl.
CPC . *A23L 3/28* (2013.01); *A23L 1/296* (2013.01); *A23L 1/0252* (2013.01); *A23V 2002/00* (2013.01); *A47J 36/2438* (2013.01)

(58) Field of Classification Search
CPC ......... A23L 3/28; A23L 1/0252; A23L 1/296; A23V 2002/00; A61L 2/0047; A61L 2/08; A61L 2/10; A61L 2202/11; A61L 2202/122; C02F 1/32
See application file for complete search history.

(56) References Cited

U.S. PATENT DOCUMENTS

| | | |
|---|---|---|
| 4,732,148 A | 3/1988 | L'Esperance, Jr. |
| 4,784,135 A | 11/1988 | Blum et al. |
| 5,104,218 A | 4/1992 | Garner |
| 2009/0182263 A1* | 7/2009 | Burbank et al. ................ 604/28 |
| 2010/0068354 A1* | 3/2010 | Roberson et al. ............ 426/118 |
| 2012/0061376 A1 | 3/2012 | McBean |
| 2012/0205299 A1* | 8/2012 | Darwinkel et al. ............ 210/97 |
| 2012/0271271 A1 | 10/2012 | Hyun |
| 2013/0237957 A1 | 9/2013 | Hyun |
| 2013/0319915 A1* | 12/2013 | Gellibolian et al. ........... 210/87 |

* cited by examiner

*Primary Examiner* — Xiuyu Tai
(74) *Attorney, Agent, or Firm* — Nydegger & Associates

(57) ABSTRACT

A system for preparing a nutritional liquid for ingestion by a neonate is disclosed. The system includes a receptacle for sterilizing water for use in warming the nutritional liquid. A sterilizer having an ultraviolet (UV) light source is engaged with the receptacle, and a fluid pump is provided to pump sterilized water from the receptacle and into a sleeve compartment of a warming bag. The sleeve compartment surrounds an interior pocket that is dimensioned to receive a container that is filled with the nutritional liquid. The system also includes a heater/vibrator having a reservoir and a heating element. The reservoir is dimensioned to receive the warming bag and liquid-filled container. When the heating element is activated, heat is conducted from the heating element to the reservoir, from the reservoir to the water, and from the water to the nutritional liquid in the liquid-filled container.

16 Claims, 2 Drawing Sheets

UV ADAPTER FOR PREPARATION OF NEONATE NUTRITIONAL FLUID

FIELD OF THE INVENTION

The present invention pertains generally to systems and methods for preparing a nutritional liquid for ingestion by a neonate. More particularly, the present invention pertains to systems and methods for warming a neonate nutritional liquid using a conductive heat transfer process. The present invention is particularly, but not exclusively, useful as a system for sterilizing and heating water and for thereafter using the water to warm a neonate nutritional liquid by conductively transferring heat from the water to the neonate nutritional liquid.

BACKGROUND OF THE INVENTION

Neonatal Intensive Care Units (NICU) specialize in treating and caring for newborn infants that are ill and/or born prematurely. In these units, neonates (i.e. infants less than about 4 weeks old) are typically fed nutritional liquids such as breast milk from the baby's mother or prepared formula. For these feedings, milk pumped from the baby's mother is often refrigerated or frozen during storage. Prior to administration of the nutritional liquid to the neonate, the stored milk/formula is defrosted (if necessary) and warmed to a suitable temperature. In the past, the process of defrosting/warming of baby bottles has been a relatively labor intensive, time consuming process. For example, defrosting/warming of a baby bottle by immersing the bottle in a cup of tap water or microwave heated water can be a labor intensive process. Further compounding this poor situation is the fact that these procedures are typically performed by a highly skilled NICU nurse whose skills and time are much more valuable in performing other functions in the NICU. Moreover, these rudimentary heating techniques can damage the nutritional liquid by overheating it and often result in a nutritional liquid that is either too hot or too cold for the neonate.

As alluded to above, nutritional fluids for neonates must be served at the proper temperature. The optimal serving temperature is about 97° F.; close to the temperature that breast milk is delivered by a mother. Since this temperature is 27 degrees Fahrenheit above room temperature, the nutritional fluids must typically be warmed before they are administered to the neonate. During warming of the fluid, care must be taken to avoid overheating the fluid. In fact, temperatures over about 103° F. can kill enzymes, proteins and blood cells that are important components of the nutritional fluid. In this regard, heating techniques that rely on radiation and/or convective heat transfer tend to heat the fluid in a non-uniform manner. This non-uniform heating can often result in hot spots (i.e. portions of the fluid that are overheated), resulting in the destruction of important fluid components.

While handling the fluid, and during the warming process, it is important to ensure that bacteria is not introduced into the nutritional fluid. This is because exposure of a neonate to certain types of bacteria can cause adverse complications. One such adverse complication, necrotizing enterocolitis (NEC) occurs in about 3%-7% of all infants in neonatal intensive care units. In more detail, NEC is an inflammatory gastrointestinal (GI) disease which causes tissue necrosis in the GI tract. Unfortunately, a large percentage of neonates that contract NEC die of the disease (in one study an NEC morbidity rate exceeding 25 percent was found).

One way to avoid the introduction of harmful bacteria is to sterilize the materials, containers and equipment that are used to defrost and/or warm the nutritional fluid. Known sterilization techniques include the application of heat, chemicals, irradiation or high pressure. One form of sterilization involves the use of non-ionizing ultraviolet (UV) radiation from a germicidal lamp. For this technique to be effective, the targeted bacteria must be exposed to the UV light for a minimum period of time. This exposure time is generally dependent on the intensity of the UV light being used. For the sterilization process, the UV light generated by a germicidal lamp typically has a UV-C wavelength. At these wavelengths, the light is harmful to humans. Thus, sterilization using this type of radiation must be performed inside a protective (i.e. shielded) housing.

In light of the above, it is an object of the present invention to provide a system and method for preparing a nutritional liquid for ingestion by a neonate. Another object of the present invention is to provide a system and method for warming and administering a nutritional fluid to a neonate at the proper temperature without introducing harmful bacteria. Yet another object of the present invention is to provide a system and method for sterilizing and heating water that can be used to warm a neonate nutritional liquid by conductively transferring heat from the water to the neonate nutritional liquid. Still another object of the present invention is to provide a UV adapter for preparation of neonate nutritional fluid that is easy to use and comparatively cost effective.

SUMMARY OF THE INVENTION

In accordance with the present invention, a system for preparing a nutritional liquid for ingestion by a neonate includes a receptacle for use in sterilizing water. Once sterilized, the water can be used to warm the nutritional liquid. For the system, the sterilization receptacle is formed with a chamber for holding the water and a cover that is formed with a lid. With this arrangement, the lid can be opened to provide access for introducing water into the chamber. In addition to the cover, the receptacle has a base member that is positioned opposite the chamber from the cover, and a sidewall is included that interconnects the cover with the base member. Importantly, the sidewall, cover and lid are made of a material that is opaque to ultraviolet light. On the other hand, the base member is made of a material that is transparent to ultraviolet light.

To sterilize the water, a sterilizer having an ultraviolet (UV) light source can be permanently engaged with the receptacle. For this arrangement, the UV light source is mounted on a support member that is formed with a recess for receiving the base member of the receptacle. Also, a lens is mounted in the recess of the support member so it will be positioned between the light source and the base member of the receptacle when they are joined together. With this structure, the lens directs UV light from the light source into the chamber of the receptacle to sterilize water in the chamber.

Also for the present invention, a fluid pump is engaged with the receptacle to pump sterilized water from the chamber. As implied above, in order to shield users from harmful UV radiation during sterilization of the water, the cover, lid and sidewall of the receptacle, as well as the fluid pump are all made of a material that is opaque to ultraviolet light.

In more structural detail, for the present invention the fluid pump can include a pipe that has a first end and a second end. In use, the pipe is positioned inside the chamber and is located along the sidewall of the receptacle. As so positioned, the first end of the pipe is located adjacent to the base member and the second end of the pipe projects outside the chamber of the receptacle. There, the pipe is connected in fluid communication with a pumping valve. A faucet is also connected to the pumping valve at the second end of the pipe, and the faucet is connected in fluid communication with the pumping valve for dispensing sterilized water from the receptacle. For example, the sterilized water can be pumped into a sleeve compartment of a warming bag.

To receive sterilized water from the faucet and into the sleeve compartment of the warming bag, the warming bag can include a filling tube that has a first end which is connected in fluid communication with the sleeve compartment. On the other hand, the second end of the filling tube is conformed to establish a fluid tight engagement with the faucet. The warming bag can also include a clamp for selective engagement with the filling tube to prevent fluid flow through the filling tube when the second end of the filling tube is disengaged from the faucet.

For use in the present invention, the sleeve compartment of the warming bag surrounds an interior pocket that is dimensioned to receive a container which is filled with the nutritional liquid. With this cooperative interaction of structure, the water-filled sleeve compartment is positioned in direct contact with the liquid-filled container to allow for conductive heat transfer between the water in the sleeve compartment and the nutritional liquid in the container.

To heat the water in the sleeve compartment, and the nutritional liquid in the liquid-filled container, the system includes a conductive reservoir that is dimensioned to receive a warming bag with a liquid-filled container being held therein. For the present invention, it is envisioned that the reservoir is formed into a heater/vibrator which has a heating element and a vibrator element. When the warming bag is properly positioned in the reservoir, the sleeve compartment is in direct contact with the reservoir to allow for conductive heat transfer between the water and the conductive reservoir. As the heating element is then activated, heat is conducted from the heating element to the conductive reservoir, from the conductive reservoir to the water, and from the water to the nutritional liquid in the liquid-filled container. During heating, the vibrator element can be activated to vibrate the liquid-filled container in the reservoir to facilitate warming the liquid in the container.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
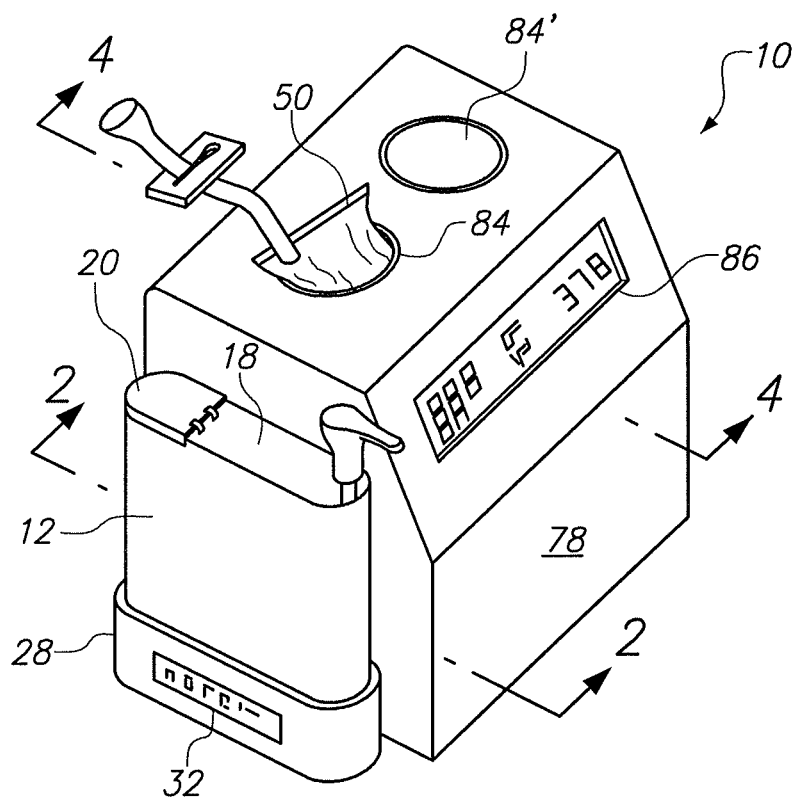
FIG. 1 is a perspective view of a system for preparing a nutritional liquid for ingestion by a neonate in accordance with the present invention.

With initial reference to FIG. 1, a system for preparing a nutritional liquid for ingestion by a neonate is shown and is generally designated 10. As shown in FIG. 1, the system 10 includes a receptacle 12 for use in sterilizing water. Once sterilized, the water can be used to warm the nutritional liquid.

Figure 2:
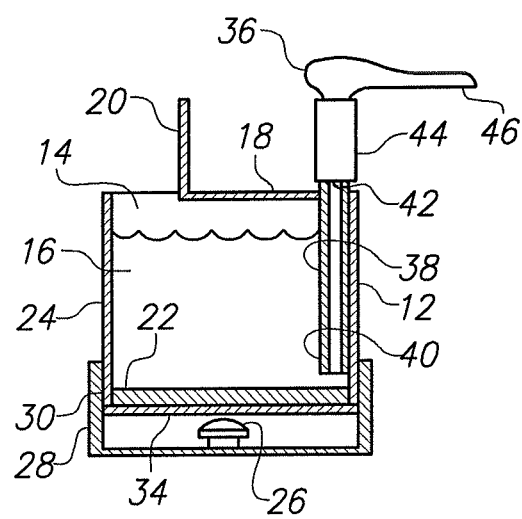
FIG. 2 is a cross-section view of a sterilization reservoir as seen along line 2-2 in FIG. 1.

As best seen in FIG. 2, the sterilization receptacle 12 is formed with a chamber 14 for holding the water 16, and a cover 18 that is formed with a lid 20. Comparing FIG. 1 with FIG. 2, it can be seen that the lid 20 can be reconfigured between a closed position (FIG. 1) and an open position (FIG. 2). In the closed position shown in FIG. 1, the lid 20 shields a user (not shown) from UV light during sterilization. In the open position shown in FIG. 2, the lid 20 is positioned to provide access for introducing water 16 into the chamber 14. FIGS. 1 and 2 also show that the receptacle 12 has a base member 22. For the system 10, the base member 22 is typically made of a material that is transparent to ultraviolet light. As shown, the base member 22 is positioned opposite the chamber 14 from the cover 18 and a sidewall 24 is included that interconnects the cover 18 with the base member 22.

Continuing with cross reference to FIGS. 1 and 2, it can be seen that an ultraviolet (UV) light source 26 can be permanently engaged with the receptacle 12. Specifically, as shown, the UV light source 26 is mounted on a support member 28 that is formed with a recess 30 (see also FIG. 3) for receiving the base member 22. As shown, a control panel 32 can be mounted on the support member 28 and electrically connected to the light source 26 to control the operation of the light sources 26. FIG. 2 also shows that a lens 34 is mounted on the support member 28, in the recess 30, to position the lens 34 between the light source 26 and the base member 22. Functionally, the lens 34 directs UV light from the light source 26 into the chamber 14 of the receptacle 12 to sterilize the water 16. As envisioned for the present invention, UV light for this purpose will have a wavelength, $\lambda$, of approximately two hundred fifty four nanometers ($\lambda$=254 nm).

FIG. 2 further shows that a fluid pump 36 is engaged with the receptacle 12 to pump sterilized water 16 from the chamber 14. As shown, the pump 36 includes a pipe 38 that has a first end 40 and a second end 42. Also shown, the pipe 38 is positioned inside the chamber 14 and along the sidewall 24 of the receptacle 12. Once positioned, the first end 40 of the pipe 38 is located adjacent the base member 22 and the second end 42 of the pipe 38 extends outside the chamber 14 of the receptacle 12. FIG. 2 shows that the second end 42 of the pipe 38 is connected in fluid communication with a pumping valve 44. For example, pumping valve 44 can be a one way valve assembly similar to the valve assemblies commonly used to dispense hand soap. FIG. 2 further shows that a faucet 46 is affixed to the valve 44 for dispensing sterilized water 16 from the receptacle 12. To shield users from harmful UV radiation during sterilization, the cover 18, lid 20 and sidewall 24 of the receptacle 12, as well as the fluid pump 36 are all made of a material that is opaque to ultraviolet light.

Figure 3:
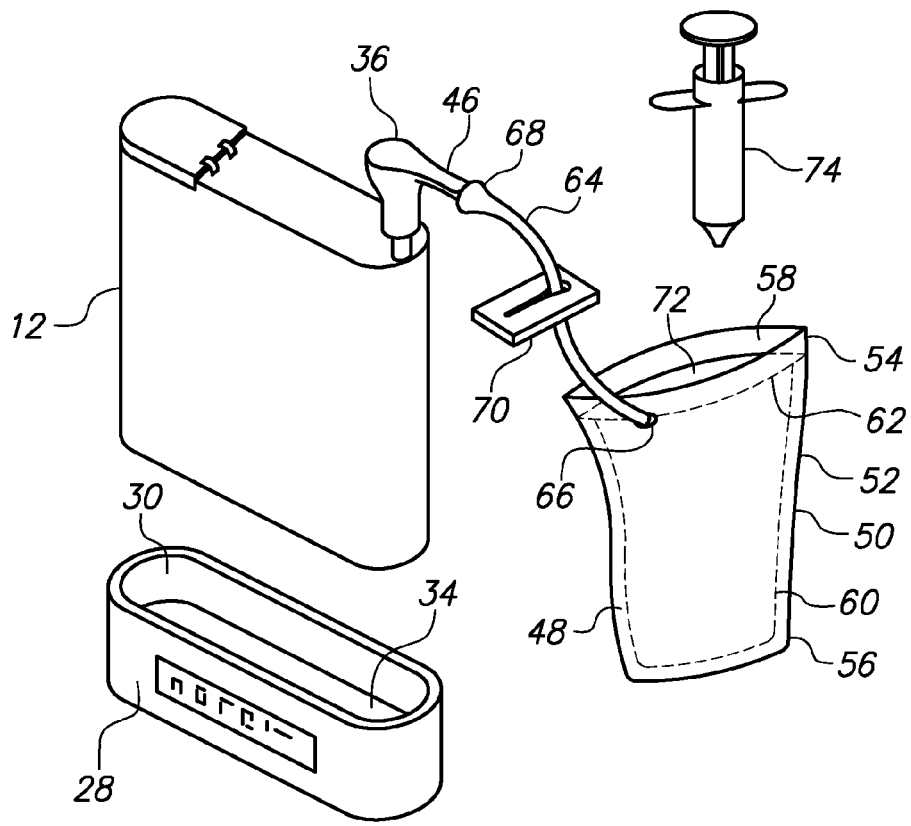
FIG. 3 is an exploded view of a sterilization receptacle, warming bag and container filled with neonate nutritional liquid.

FIG. 3 illustrates a procedure in which sterilized water from a receptacle 12 is pumped into a sleeve compartment 48 of a warming bag 50. As shown, the warming bag 50 can include an outer bag portion 52 having an open end 54 and a closed end 56. As further shown, the open end 54 of the outer bag portion 52 defines a periphery 58 and the outer bag portion 52 is formed to have a decreasing taper from its open end 54 toward its closed end 56.

Continuing with FIG. 3, it can be seen that the warming bag 50 includes an inner bag portion 60, which is conformed to be received into the outer bag portion 52. With this structural combination, the open end 62 of the inner bag portion 60 can be affixed to the periphery 58 of the outer bag portion 52 to create a permanent, fluid-tight seal and establish the sleeve compartment 48. More details regarding a suitable warming bag for use herein can be found in U.S. application Ser. No. 13/967,025 titled "WARMING BAG FOR NEONATE NUTRITIONAL LIQUID" to Janice M. Shields, filed concurrently herewith, the entire contents of which are hereby incorporated by reference herein.

FIG. 3 further shows that the warming bag 50 can include a filling tube 64 that has a first end 66 that is connected in fluid communication with the sleeve compartment 48 of the warming bag 50. As shown, the second end 68 of the filling tube 64 is conformed to establish a fluid tight engagement with the faucet 46. FIG. 3 also shows that a clamp 70 can be used for selective engagement with the filling tube 64 to prevent fluid flow through the filling tube 64 when the second end 68 of the filling tube 64 is disengaged from the faucet 46.

Figure 4:
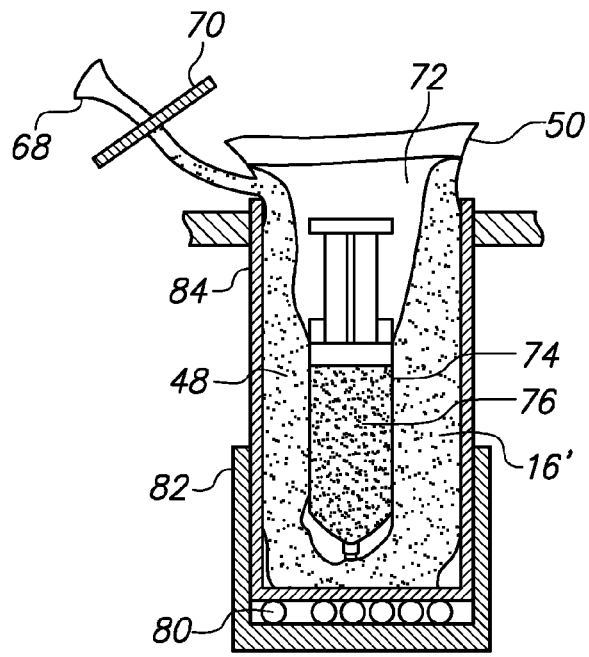
FIG. 4 is a cross-section view of a warming bag and container filled with neonate nutritional liquid and heating reservoir as seen along line 4-4 in FIG. 1.

Cross referencing FIGS. 3 and 4, it can be seen that the sleeve compartment 48 of the warming bag 50 surrounds an interior pocket 72 that is dimensioned to receive a container 74 that is filled with nutritional liquid 76. Although the container 74 is shown as a syringe type feeding unit, it is to be appreciated that other containers such as a standard baby bottle (not shown) may be used. As FIG. 4 shows, the water-filled sleeve compartment 48 is positioned in direct contact with the liquid-filled container 74 to allow for conductive heat transfer between the sterilized water 16' in the sleeve compartment 48 and the nutritional liquid 76 in the container 74.

Cross-referencing FIGS. 1 and 4, it can be seen that the system 10 includes a heater/vibrator 78 having a heating element 80 and a vibrator element 82. As shown, the heating element 80 is positioned to heat a conductive reservoir 84 that is formed in the heater/vibrator 78 and dimensioned to receive the warming bag 50 and liquid-filled container 74. As shown in FIG. 1, the heater/vibrator 78 can be formed with additional reservoirs 84 (e.g. reservoir 84') and it can include a control panel 86 to control the heating element 80 and the vibrator element 82. FIGS. 1 and 4 show warming bag 50 positioned in the reservoir 84. As best seen in 4, the sleeve compartment 48 is in direct contact with the reservoir 84 to allow for conductive heat transfer between the sterilized water 16' and the conductive reservoir 84. When the heating element 80 is activated, heat is conducted from the heating element 80 to the conductive reservoir 84, from the conductive reservoir 84 to the water 16', and from the water 16' to the nutritional liquid 76 in the liquid-filled container 74. During heating, the vibrator element 82 can be activated to vibrate the liquid-filled container 74 in the reservoir 84 to facilitate warming the nutritional liquid 76 in the container 74.

While the particular UV adapter for preparation of neonate nutritional fluid as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for preparing a nutritional liquid for ingestion by a neonate which comprises:
    a receptacle formed with a chamber for holding water, wherein the receptacle includes a cover formed with a lid for selectively filling the chamber of the receptacle with water, and wherein the receptacle has a base member opposite the chamber from the cover with a sidewall interconnecting the cover with the base member;
    a sterilizer for emitting ultraviolet light engaged with the receptacle for sterilizing water in the chamber; and
    a fluid pump engaged with the receptacle for pumping sterilized water from the chamber and into a sleeve compartment surrounding an interior pocket of a bag, wherein the interior pocket of the bag is dimensioned to receive a container filled with the nutritional liquid therein and to position the water-filled sleeve compartment into direct contact with the liquid-filled container, to surround the container during a conductive heating and a vibration of the container.

2. A system as recited in claim 1 further comprising:
    a heater/vibrator;
    a reservoir formed into the heater/vibrator for receiving the bag therein, with the water-filled sleeve compartment of the bag surrounding the liquid-filled container;
    a heating element mounted on the heater/vibrator for warming the liquid-filled container in the reservoir; and
    a vibrator element mounted on the heater/vibrator for vibrating the liquid-filled container in the reservoir to facilitate warming the liquid in the container.

3. A system as recited in claim 1 wherein the sterilizer is permanently engaged with the receptacle.

4. A system as recited in claim 1 wherein the fluid pump comprises:
    a pipe having a first end and a second end, with the pipe positioned inside the chamber and along the sidewall of the receptacle with the first end thereof at a location adjacent the base member and the second end thereof projecting outside the chamber of the receptacle;
    a pumping valve in fluid communication with the second end of the pipe; and
    a faucet affixed to the second end of the pipe in fluid communication with the pumping valve for dispensing sterilized water from the receptacle.

5. A system as recited in claim 4 wherein the bag comprises:
    a filling tube having a first end and a second end, wherein the first end is connected in fluid communication with the sleeve compartment surrounding the interior pocket of the bag, and wherein the second end is conformed to establish a fluid tight engagement with the faucet; and
    a clamp for selective engagement with the filling tube, to prevent fluid flow through the filling tube when the second end of the filling tube is disengaged from the faucet.

6. A system as recited in claim 1 wherein the sterilizer comprises:
    a support member;
    an ultraviolet (UV) light source mounted on the support member, wherein the support member is formed with a recess for receiving the base member of the receptacle therein hold the receptacle on the support member; and
    a lens mounted on the support member, in the recess, to position the lens between the light source and the base member of the receptacle for directing UV light from the light source into the chamber of the receptacle to sterilize water in the chamber.

7. A system as recited in claim 1 wherein the cover and lid of the receptacle, the sidewall of the receptacle, and the fluid pump are each made of a material opaque to ultraviolet light, and the base member of the receptacle is made of a material transparent to ultraviolet light.

8. A system as recited in claim 1 wherein the bag comprises:
    an outer bag portion having an open end and a closed end, wherein the open end defines a periphery, and wherein the outer bag portion has a decreasing taper from the open end toward the closed end;
    an inner bag portion having an open end and a closed end, wherein the inner bag portion is conformed to be received into the outer bag portion, and wherein the open end of the inner bag portion is affixed to the periphery of the open end of the outer bag portion in a fluid tight seal to establish the sleeve compartment.

9. A system as recited in claim 8 further comprising a mechanical seal located adjacent the periphery of the outer bag portion to selectively enclose the container filled with the neonate nutritional liquid inside the interior pocket during a warming procedure.

10. A system as recited in claim 8 wherein a material for the outer bag portion is UV transparent.

11. A system component as recited in claim 1 wherein the neonate nutritional liquid is selected from the group consisting of mother's milk and prepared formula.

12. A system for preparing a nutritional liquid for ingestion by a neonate which comprises:
- a means for holding water;
- a sterilizing means engaged with the holding means, the sterilizing means emitting ultraviolet (UV) light to sterilize water in the holding means;
- a bag having a sleeve compartment surrounding an interior pocket, the interior pocket dimensioned to hold a container filled with the neonate nutritional liquid; and
- a means for pumping sterilized water into the sleeve compartment from the holding means to surround the container with sterilized water during a conductive heating of the neonate nutritional liquid.

13. A system as recited in claim 12 further comprising:
a heating means having a heating element; and
a reservoir formed into the heater means for receiving the bag therein, with the water-filled sleeve compartment of the bag surrounding the liquid-filled container.

14. A system as recited in claim 12 wherein the pumping means comprises:
- a pipe having a first end positioned inside the holding means and a second end projecting outside the holding means;
- a pumping valve in fluid communication with the second end of the pipe; and
- a faucet affixed to the second end of the pipe in fluid communication with the pumping valve for dispensing sterilized water from the holding means.

15. A system as recited in claim 14 wherein the bag comprises:
- a filling tube having a first end and a second end, wherein the first end is connected in fluid communication with the sleeve compartment surrounding the interior pocket of the bag, and wherein the second end is conformed to establish a fluid tight engagement with the faucet; and
- a clamp for selective engagement with the filling tube, to prevent fluid flow through the filling tube when the second end of the filling tube is disengaged from the faucet.

16. A system as recited in claim 12 wherein the bag comprises:
- an outer bag portion having an open end and a closed end, wherein the open end defines a periphery, and wherein the outer bag portion has a decreasing taper from the open end toward the closed end; and
- an inner bag portion having an open end and a closed end, wherein the inner bag portion is conformed to be received into the outer bag portion, and wherein the open end of the inner bag portion is affixed to the periphery of the open end of the outer bag portion in a fluid tight seal to establish the sleeve compartment.

\* \* \* \* \*